US006577253B2

United States Patent
Azam et al.

(10) Patent No.: US 6,577,253 B2
(45) Date of Patent: *Jun. 10, 2003

(54) HIGHLY COMPRESSED AND SCALEABLE OUTLINE FONT ENGINE

(75) Inventors: Syed Aamer Azam, Union City, CA (US); Matthias W. Reinsch, Oakland, CA (US)

(73) Assignee: Morisawa & Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/083,099

(22) Filed: Feb. 25, 2002

(65) Prior Publication Data

US 2002/0118124 A1 Aug. 29, 2002

Related U.S. Application Data

(63) Continuation of application No. 09/685,989, filed on Oct. 10, 2000.

(51) Int. Cl.⁷ ................................................ H03M 7/00
(52) U.S. Cl. ........................................................ 341/50
(58) Field of Search .......................... 341/51, 50, 106, 341/107

(56) References Cited

U.S. PATENT DOCUMENTS 6,384,745 B1 * 5/2002 Azam .......................... 341/50

* cited by examiner

Primary Examiner—Brian Young
(74) Attorney, Agent, or Firm—Silicon Valley IP Group; Kevin J. Zilka

(57) ABSTRACT

A system, method and computer program product are provided for compression of characters. Initially, characters are received after which a mathematical representation for the characters is selected based on a desired level of compression quality of the characters. Such characters are then represented using the selected mathematical representation so that the mathematical representation of the characters may be compressed.

7 Claims, 11 Drawing Sheets

FORM AN ORDERED
EDGE-LIST OF BOUNDARY
SEGMENTS

FOR EACH SCAN FIND AND
SORT THE BOUNDARIES FILLING
BETWEEN

UNTIL ALL SCAN LINES ARE PROCESSED

ODD WINDING NUMBER

NON-ZERO WINDING NUMBER

DIRECTION AND WINDING NUMBERS

HIGHLY COMPRESSED AND SCALEABLE OUTLINE FONT ENGINE

RELATED APPLICATION(S)

This application is a continuation of a parent application filed Oct. 10, 2000 under Ser. No. 09/685,989, which is incorporated herein by reference in its entirety.

FIELD OF THE INVENTION

The present invention generally relates to processing of image data and more particularly to an image data processing method for compressing two-dimensional curve image data.

BACKGROUND OF THE INVENTION

In the field of image processing, a two-dimensional curve image, i.e. a font character, is usually decomposed into a number of segments, and vectors are assigned in correspondence to each of the segments. Thus, the curve is represented by a number of vectors each corresponding to the segment. In such a method, when the curve has a large curvature or is intricate, a large number of vectors are needed. Associated therewith, information to be processed is increased, which causes a difficulty in transmission or storage in memory.

The motivation for using mathematical formats for fonts is to achieve a more compact description of characters. By introducing new types of mathematical objects that are tailored to the characters, the amount of data needed to store the description is reduced. The chosen primitives differ for the various font families depending on the typical shapes of the characters themselves.

The compression occurs for two reasons. The first is the fact that individual character scripts have lots of similarities and these similarities can be exploited by choosing a mathematical basis of either various kinds of areas or various kinds of lines. The basis itself is not static but can have mathematical transformations applied to its elements. These transformations include, but are not limited to stretching, expanding, contracting, and bending. The transformations themselves are finite and are encoded using a few parameters.

The second reason that compression occurs is that the individual set of areas or lines describe the respective curves in a more compact fashion than do a series of dots connecting outlines (like TrueType or PostScript) since the finite set of areas or lines are better suited to the curves than an arbitrary choice of connection such as a B-spline employed by both TrueType and PostScript.

There is therefore a need for a system capable of utilizing mathematical representations in an optimal manner during the course of character compression.

DISCLOSURE OF THE INVENTION

A system, method and computer program product are provided for compression of characters. Initially, characters are received after which a mathematical representation for the characters is selected based on a desired level of compression quality of the characters. Such characters are then represented using the selected mathematical representation so that the mathematical representation of the characters may be compressed.

In one embodiment of present invention, the mathematical representation may include parameterized curves, rational functions, and/or polynomials. Such polynomials may include exponents that are a power of two (2). Further, a width of a portion of the characters may be represented by a mathematical representation including a curve and two functions which indicate distances perpendicular to the curve.

DESCRIPTION OF THE PREFERRED EMBODIMENTS

Figure 1:
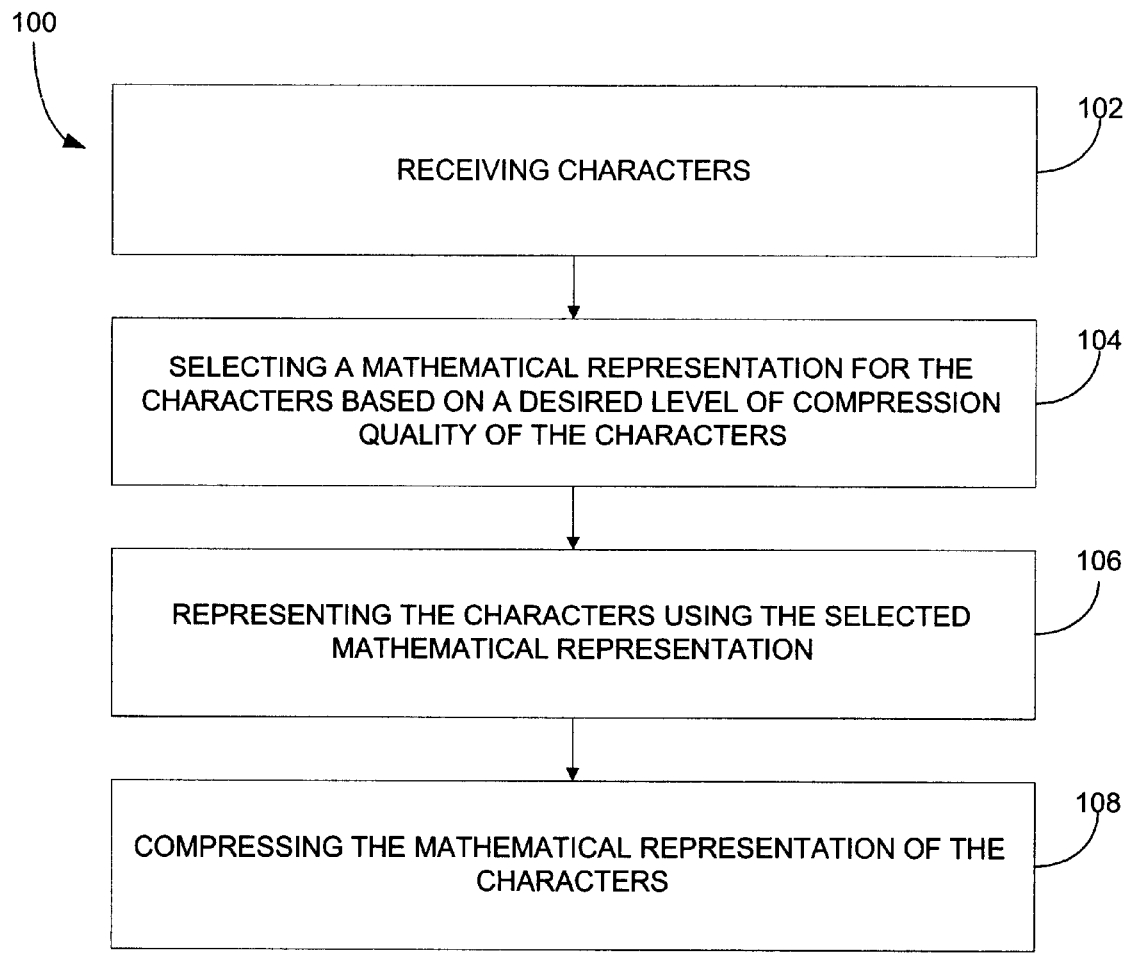
FIG. 1 illustrates a method for compression of characters in accordance with one embodiment of the present invention.

FIG. 1 illustrates a method 100 for compression of characters. Such characters may take the form of alphabetical, numerical, or any other type of textual characters. Compression may be for the purpose of efficient storage and/or transmission of the characters, or any other desired purpose.

Initially, in operation 102, characters are received. Thereafter, a mathematical representation for the characters is selected based on a desired level of compression quality of the characters. See operation 104. This selection may be manual, or automatic using a chart or the like. For example, certain mathematical representations may be associated with predetermined levels of quality. As an option, such mathematical representations may also be selected as a function of the type of character font being compressed, since different fonts may be compressed with better quality using certain mathematical representations. By this design, the mathematical representations may be chosen given a desired level of quality, thus permitting a tradeoff between quality and size. Such characters are then represented using the selected mathematical representation so that the mathematical representation of the characters may be compressed.

As an option, the mathematical representation may include parameterized curves, rational functions, and/or polynomials. Such polynomials may include exponents that are a power of two (2). Further, a width of a portion of the characters may be represented by a mathematical representation including a curve and two functions which indicate distances perpendicular to the curve. More details regarding such will be set forth hereinafter.

Figure 2:
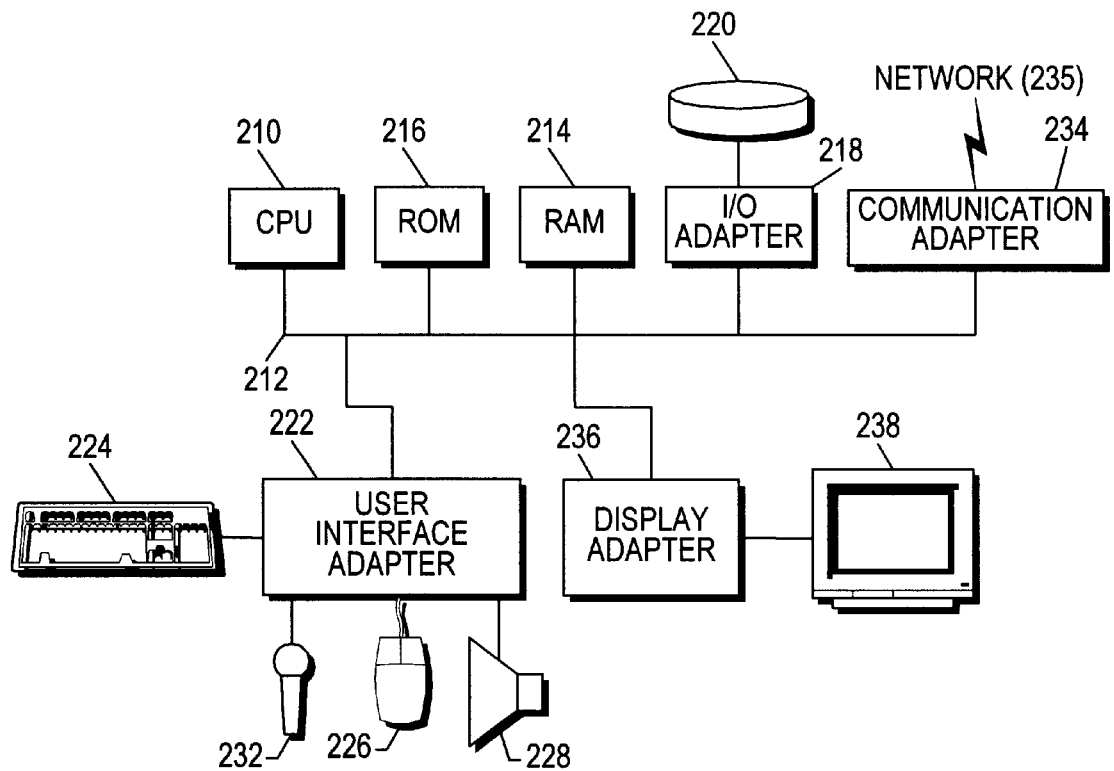
FIG. 2 shows a representative hardware environment in which the foregoing method of FIG. 1 may be carried out.

FIG. 2 shows a representative hardware environment in which the foregoing method 100 of FIG. 1 may be carried out. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

The present invention is capable of adjusting compression in terms of quality by selecting a particular mathematical representation. Depending on the quality needed for the appropriate number of curves, an appropriate mathematical basis may be chosen as well as the finite set of transformations. Hence, the user can make an educated trade-off between quality and size.

One mathematical representation that may be used for this procedure is parameterized curves. A parameterized curve is a mapping from a subset of the real numbers (usually a closed interval) to the plane. Such a parameterization can be accomplished using two real-valued functions $x(t)$ and $y(t)$. For ease of computation, it is good to restrict the set of functions used for $x(t)$ and $y(t)$ to functions such as polynomials, which can be evaluated quickly. Rational functions (quotients of polynomials) are also useful in this respect. A wide variety of curves can be described in this way. For example, Table 1 illustrates the equations for a perfect circle.

TABLE 1

$x(t) = R (1 - t^2)/(1 + t^2)$
$y(t) = 2 R t/(1 + t^2)$

This can be verified by calculating $X^2 + y^2$. These functions can be evaluated more rapidly than the square roots, sines and cosines used in other parameterizations of circles. Even when using integer math, these formulas are useful because the radius R will be a number greater than 1, and the coordinates x and y will have to be rounded to integer values anyway when rasterizing the glyph.

A wide variety of curves can be parameterized using polynomials only. One way to do this is to use the functions shown in Table 2.

TABLE 2

$f_{n, k}(t) = n!\ t^k (1 - t)^{n - k}/[k!\ (n - k)!]$

These functions have the property that when they are summed over the integer k for fixed values of the integer n, the result is a constant function, 1. The range of summation for k is 0 to n. Furthermore, each of these functions is manifestly positive on the open interval (0, 1). What makes these functions useful is that each of them has a single localized maximum on the interval (0, 1), so they can be used to adjust the shape of a parameterized curve in one small region of the curve.

The location of the maximum of $f_{n,k}(t)$ can be found using elementary calculus by setting the first derivative with respect to t equal to zero, and solving for t. The result is $t = k/n$. It is also of interest to know the value of $f_{n,k}(t)$ at this point. The result can be transformed to a form that is faster to evaluate using Stirling's approximation for the factorial function. The upshot of this is that if the function $f_{n,k}(t)$ defined above is multiplied by the square root of $2\pi k(n-k)/n$, then the resulting function has the same properties in terms of its maximum and localization, but also assumes a value approximately equal to 1 at its maximum. Having this normalization property makes it easier to implement these functions in some cases. For example, a parameterized curve may be defined by the equations of Table 3.

TABLE 3

$x(t) = F_{4, 0}(t) - F_{4, 2}(t)$
$y(t) = F_{4, 1}(t) - F_{4, 3}(t)$

With such definition, the result resembles a circle, but with only polynomials being used. Here the symbol $F_{n,k}(t)$ have been used to denote the normalized version of $f_{n,k}(t)$ described above. Polynomials can be evaluated rapidly by writing them with a nested structure so that only a few multiplications and additions are necessary. Also, the $f_{n,k}(t)$ polynomials can be generated recursively or by creating tables of the form $t^k/k!$. Other polynomials that are quick to calculate are those that have exponents that are powers of two, since powers of t can be found by repeated squaring.

In this way, fairly complicated curves can be built up using polynomials of various orders. In actual practice, it must be decided if the storage of higher-order polynomials is justified in terms of the space needed to store the necessary information.

Another advantage of polynomials is that the tangent vector is easy to determine. The tangent vector is given by the derivative of $(x(t), y(t))$. In the case of polynomials, this will again be given by polynomials, and the coefficients involved can easily be determined using the fact that the derivative of $t^n$ is $n\, t^{n-1}$. Alternatively, numerical derivatives are also possible. In this case, one uses the fact that the derivative of $(x(t), y(t))$ can be approximated by $[(x(t+\Delta t), y(t+\Delta t)) - (x(t), y(t))]/\Delta t$, for small values of $\Delta t$.

Knowledge of the tangent vector has several uses. One of such uses is that significant compression of data is possible by storing a description of a stroke in terms of one of its edges and its width. To store information about both edges would require the storage of two parameterized paths, a total of four real-valued functions of a real variable. Since the width is only one real-valued function, it is advantageous to store this rather that a parameterized path. Furthermore, the width is often a slowly varying function of the parameter, so its description can be accomplished with a smaller amount of data.

To use the information about the width, it is necessary to know a normal vector to the curve. This is a unit vector that is orthogonal to the curve. There are two possible choices for this vector, corresponding to the two sides of the curve. A choice of normal vector can be obtained by rotating the tangent vector 90 degrees and normalizing it. Such a rotation can be carried out by multiplication by the 2 by 2 matrix: ((0,-1), (1,0)). This effects a swapping of the x- and y-coordinates of the tangent vector, with a sign change for one of them.

The process of normalizing the resulting vector is also useful because it has the same length as the tangent vector, and knowledge of the length of the tangent vector makes it possible to step along the path at an optimal rate. Such an optimal rate would be about 1 pixel per step or slightly less than 1 pixel per step, so that an outline is created without gaps. Care must be taken in the case of a sharp turn in which the normal vector is pointing outwards, because then its tip is moving faster than the curve. Gaps could be filled with straight line segments.

An optional extension of the present invention is to describe a stroke in terms of a curve which is not displayed, and two functions which are used to specify distances perpendicular to the reference curve. These two functions define the locations of the edges of the stroke. They give the lateral offset of the edges relative to the reference curve. This approach is useful in cases where parameterizing the edges themselves is difficult (e.g. if they contain bumps or other features).

Figure 3:
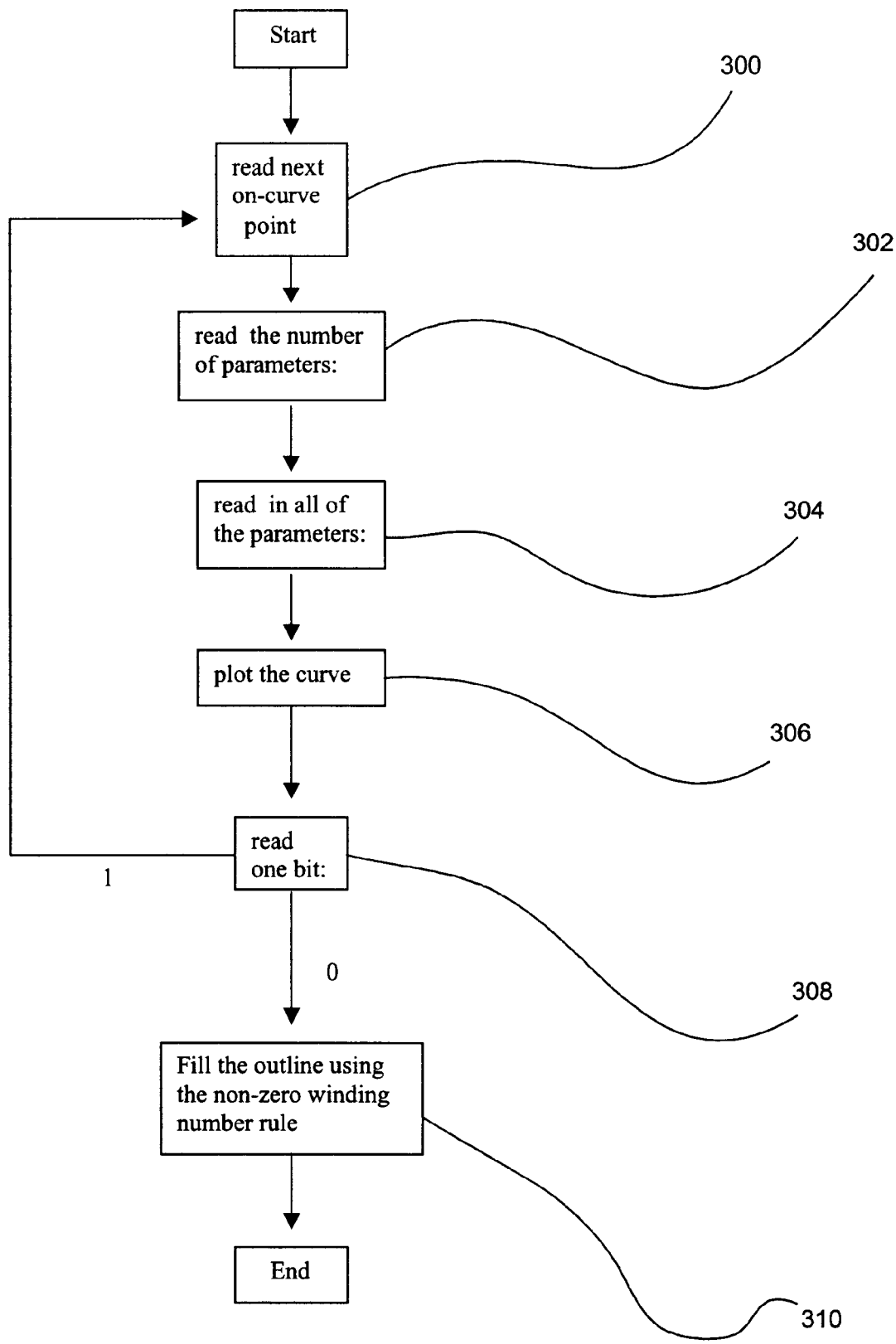
FIG. 3 shows a diagram delineating a format method in accordance with one embodiment of the present invention.
Figure 4A:
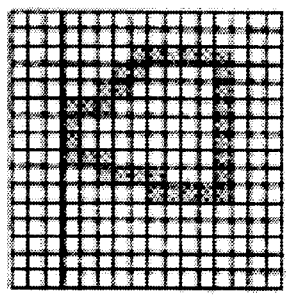
FIGS. 4–20 illustrate an exemplary system employing the non-zero winding number rule.
Figure 4B:
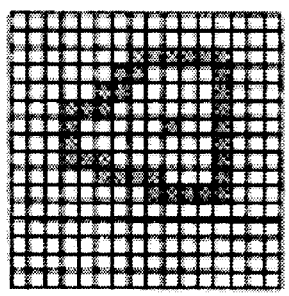
Figure 4C:
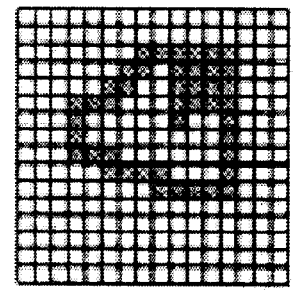
Figure 4D:
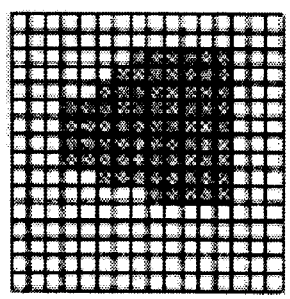

FIG. 3 shows a diagram delineating a format method in accordance with one embodiment of the present invention. It should be noted that the outline may be defined using a variety of primitives. These primitives may be specified using control points or other parameters. The set of data involved in the description of a part of the outline in this way all comes under the heading of "parameters" in the figure. For example, one of the primitives could be a lower curved stroke that occurs in Arabic glyphs. Then the parameters could be three or four numbers that define this part of the outline, given the initial on-curve starting point.

As shown in FIG. 3, a point on the curve is first read in operation 300. Thereafter, the number of parameters is read, as indicated in operation 302. All of the parameters are then read in operation 304. This then allows the curve to be plotted. Note operation 306.

Once the curve has been plotted, an indicator bit is read. See operation 308. If the bit is a "1", the process loops back to operation 300, and another point on the curve is read. If, however, the bit is "0", the process ends by the curve being filled using a standard non-zero winding number rule. See operation 310.

More information on operation 310 will now be set forth. The present invention allows the representation of polygons defined by a non-zero winding number. The advantage of this approach is that the polygons can be represented by just their borders, and many polygons can be included in the frame buffer even if they overlap. Multiple shapes defined by boundaries and a non-zero winding number can co-exist in the frame buffer. Many objects can be entered at a cost proportional to their perimeters rather than their areas, as is the case for conventional methods. Filling of all interiors can be performed in a single step as the frame buffer is imaged. Defining polygons, however, by a non-zero winding number is unusual. Most graphics systems define polygon interiors by an odd winding number. Page-description languages, such as Interpress and PostScript, support both odd- and non-zero winding number definitions. Of course, the scheme proposed could be used with a new graphics system which supported only the non-zero winding number definition, but if it is to be useful in implementing more conventional systems, then a method for converting from the odd to non-zero winding number convention is needed. For more information on an exemplary application of the present invention, additional reference may be made to GLOBALTYPE, a font compression product existent in the industry.

FIGS. 4–20 illustrate an exemplary system employing the non-zero winding number rule. Modern computer graphics is based on the frame buffer. The frame buffer provides an internal representation of the image being constructed. Images are displayed as a raster pattern of colored spots or pixels. Frame buffers are blocks of memory partitioned into data entries for each spot on the display, and usually organized according to the raster. The data in the frame buffer element corresponding to a pixel describes the color of that pixel. With the development of the frame buffer and raster graphics came the realization that solid areas (such as polygons) could be described and imaged. But in order to display a polygon, one must convert from the representation in which it is first defined (usually a list of vertex points from which the line segments forming the boundary can be derived) to the format required by the frame buffer (the set of pixels which are enclosed by the polygon). This is called rasterization or scan-conversion, and several approaches have been tried.

One approach (called flood fill or seed fill) is to draw the boundary of the polygon in the frame buffer, using some color other than the background. Then starting at some point known to be within the polygon (the seed), the technique is to grow the region by changing the color of neighboring pixels until the boundary is reached as shown in FIG. 4. This technique can be used to accumulate overlapping polygons, but it may require multiple seeds to access isolated regions. Finding seed points can be difficult and costly.

Figure 5A:
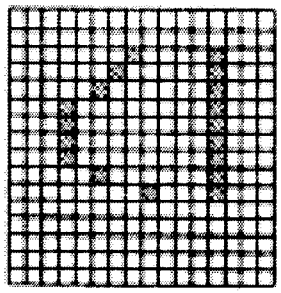
Figure 5B:
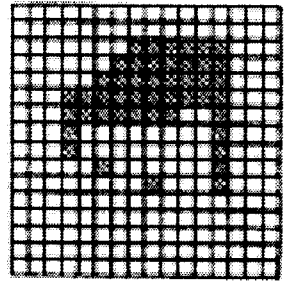
Figure 5C:
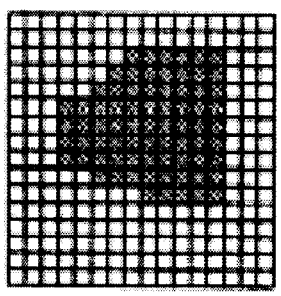

Another set of algorithms is called parity techniques. If the raster is scanned from left to right, a polygon can be constructed by drawing its left and right boundaries (the leftmost and rightmost points filled regions on each scan line). An area containing the boundary can then be scanned, noting edges as they are crossed. If an odd number of edges are crossed to reach a pixel, then pixel is colored as interior to the polygon. If an even number of edges is crossed, the pixel is outside the polygon and is not colored as illustrated in FIG. 5. This technique does not require seed points, but handling multiple overlapping polygons requires two frame buffers (or one buffer with at least three possible states for each pixel). The technique is to use one buffer to draw the boundary and determine which pixels are interior to a given polygon, and the second frame buffer to actually accumulate the composite image. Note that the first buffer must be cleared between each polygon construction.

Figure 6A:
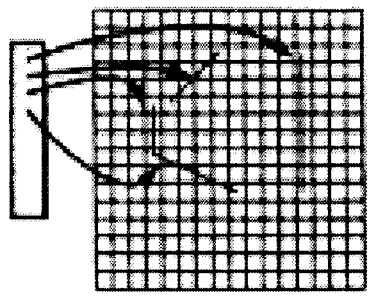
Figure 6B:
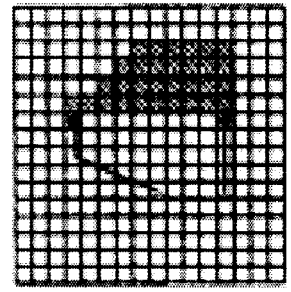
Figure 6C:
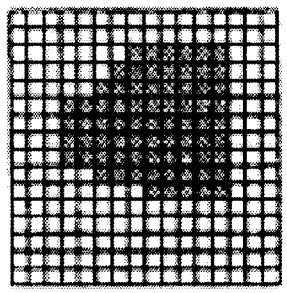

A third set of techniques is based on an ordered edge list. It is related to the parity scheme, but does not require the second frame buffer to draw the boundary. Instead, analytic descriptions of the boundary components are stored. The boundary must be represented in a form such that the intersection of the boundary with a scan line is easily calculated. The boundary is usually decomposed into straight-line edge segments, which are sorted into scan line order by their minimum-scan line endpoint. Then for each scan line the intersections with the edges are calculated and sorted into their order within the scan. These points are then used as the boundary for the interior pixels for that scan line. As with parity algorithms, a pixel on the scan line is considered interior if an odd number of boundary points are crossed to reach it as shown in FIG. 6. While this technique does not require the second frame buffer, it is limited to regions with edge descriptions which are monotonic with respect to scan line number, and which can be generated in scan line order. It also entails the processing overhead of decomposing and sorting the polygon's edge segments.

Generally, all of the filling algorithms disclosed in the prior art are based on defining the interior of a polygon by odd winding number. The winding number for a point is the number of times that point is circled in tracing the polygon boundary. Defining a point to be interior if an odd number of boundaries are crossed to reach it is equivalent to defining interior points as having an odd winding number. There is, however, another definition for the interior of a polygon. A point can be defined as interior if it has a non-zero winding number, or a positive winding number can be used as the definition. Page-description languages such as Interpress and PostScript support both non-zero and odd winding number conventions.

Figure 7A:
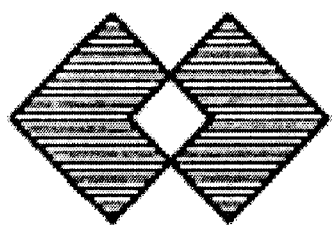

The alternative definitions yield different results when a polygon is self-intersecting or several polygons overlap. When the boundaries of two polygons defined by an odd winding number intersect, the parity of the area common to both flips from odd to even, as seen in FIG. 7a. Thus, instead of being filled twice, the common area is not filled at all. This is why parity techniques must rasterize each polygon individually, and need a second frame buffer to accumulate the image.

Figure 7B:
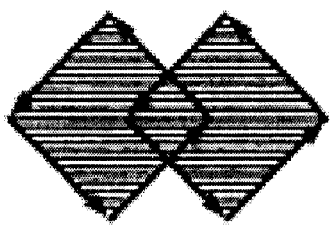
Figure 8:

If a positive winding number is used, overlapping interiors just have greater winding numbers and are still filled as shown in FIG. 7b. Thus, if polygons are defined by positive winding numbers, the boundaries for several of them can be collected and their interiors filled in a single sweep through the scan lines. An adaptation of the ordered-edge-list method to polygons defined by a non-zero winding number involves giving each edge a direction number of −1 or +1, based on whether one moves up or down along the edge as one traces the polygon boundary counter-clockwise. As one steps along a scan line and notes intersections with the boundary, the direction numbers of the edges crossed are added. This total is the winding number for the current point as illustrated in FIG. 8.

It is an object of the present invention, therefore, to provide a new and simple method for rasterizing graphic images. It is another object of the present invention to provide a system wherein the time dependency for rasterization is proportional to the perimeter of the objects drawn rather than their area, and to provide a method that can be supported by hardware and can offer a significant advantage in high-speed image generation. It is another object of the present invention to be capable of rasterizing any shape for which a positive winding number boundary can be drawn. Further advantages of the present invention will become apparent as the following description proceeds and the features characterizing the invention will be pointed out with particularity in the claims annexed to and forming a part of this specification.

In accordance with the present invention, the boundaries of polygons defined by a positive winding number are drawn directly in the frame buffer rather than stored in an ordered edge-list similar to the parity rasterization techniques. This eliminates the decomposition and sorting overhead of the edge-list technique, and allows more flexibility in the types of curves used in the boundary and the methods used to generate them.

Figure 9:
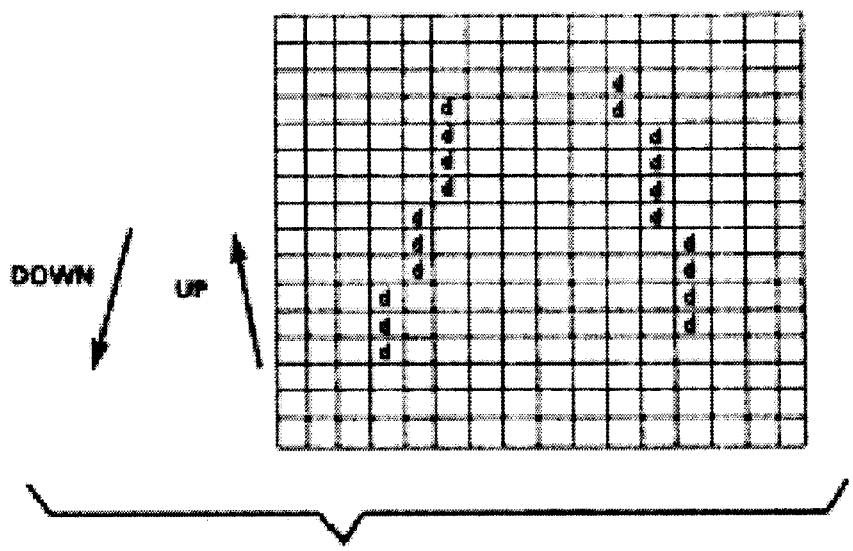

To generalize the frame buffer to handle single-color filling of positive-winding-number polygons, each pixel is allowed to have three states (background, down, up). This is most easily done by assigning two bits of storage to each pixel. The polygon boundary generated counter-clockwise and entered into the frame buffer by changing the original pixel value (background) to either up or down. As in the parity algorithms, only the left and right edges are entered (horizontal runs are not drawn) as shown in FIG. 9. The up and down states correspond to the direction numbers.

If the edge is generated from low scan lines to high scan lines the up state is stored, and if it is generated in a downward direction, the down state is stored. The boundaries for all polygons can be entered before the rasterization step. This step might be carried out in conjunction with display of the frame buffer. In the rasterization stage, one steps through the raster scan line by scan line as in parity algorithms. For a scan line, the winding number is initialized to zero and each pixel is examined. If the value is down, the winding number is incremented. If the value is up, the winding number is decremented. All pixels with a positive winding number are shaded.

Figure 10:
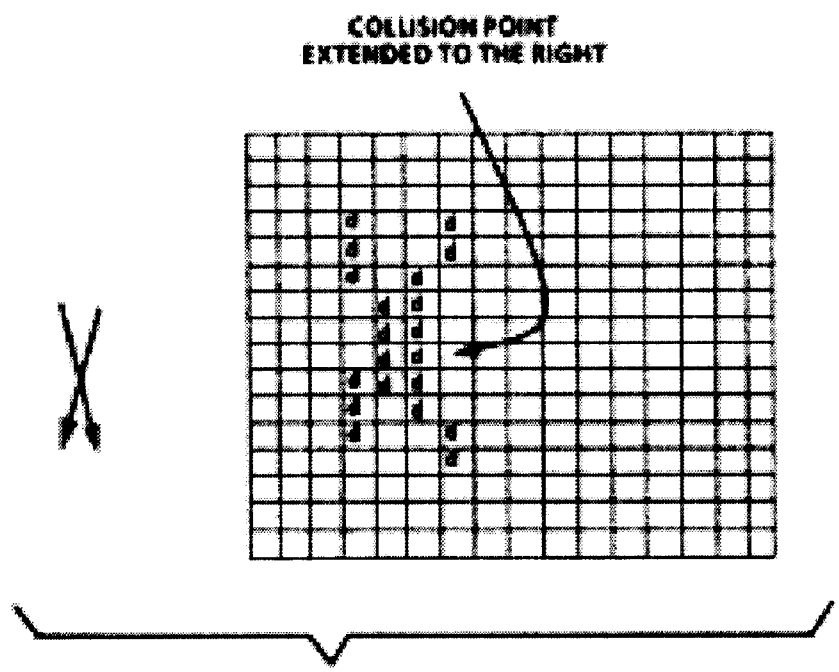

Up to this point, the method has problems at the point where two or more edges coincide as shown in FIG. 10. At these points the winding number should be changed to reflect the total increment or decrement due to all edges, but having only the two states up and down allows changes of only −1 or 1. The breakthrough which solves this problem is the realization that pixel values for colliding boundaries can be spatially offset without serious damage to the image. When a down state is to be entered, the pixel is first checked. If its value is background, the down state is entered. If the value is up, the increment and decrement of the two edges cancel, and the value background is entered. If the value is already down, consider the next pixel to the right and repeat the calculation. Thus, a series of colliding down edges result in a series of down entries propagating to the right. At the end of the series the winding number will be correct. Drawing upward edges are handled similarly, except when the pixel already has an up value the pixel to the left is checked.

Figure 11:
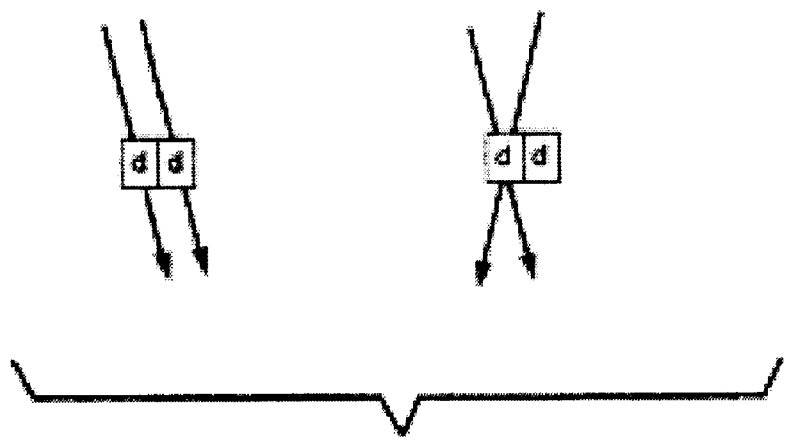
Figure 12:
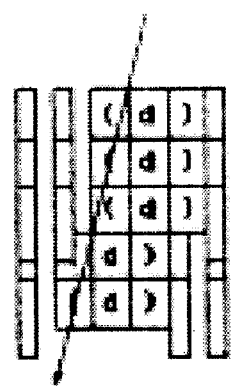
Figure 13:
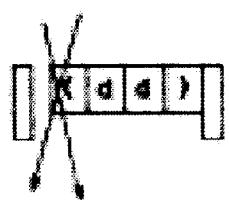

The scheme is not completely free of errors. Two down pixels in a row can result either from two downward lines passing through the separate pixels, or by both passing through the left pixel as shown in FIG. 11. One cannot distinguish the two cases. So if an upward line is drawn through the left point, one does not known whether the left or right down pixel should be canceled. Note, however, that such errors are localized to the area of the collision series, and occur only if both up and down lines are present.

One common situation where such collisions can occur is along clipping boundaries where several polygons are clipped to a common edge. In these cases when an up value collides with a series of down pixels it is best to cancel the rightmost pixel in the series. Likewise, when a down pixel collides with a series of up pixels the leftmost should be canceled. This strategy prevents shrinkage of the clipping region.

The following is an algorithm to implement the above procedure:

A. Set all points in the extended frame buffer to background.
B. Enter the boundaries for all polygons
   1. Step counter-clockwise around the polygon boundary generating pixel coordinates for the left and right boundaries.
   2. For each pixel on a downward edge call StoreDownPoint. For each pixel on an upward edge call StoreUpPoint.
C. Display the image
   1. For each scan line
      Set the winding number to 0.
      Step through the pixels on the scan line
         if a pixel has the value down, increment the winding number
         if a pixel has the value up, decrement the winding number
         if the winding number is positive, display the pixel as shaded, otherwise display it as unshaded.

Thus in the extended frame buffer each pixel has three possible states, background, up, and down. Points are entered into the frame buffer by the following two procedures.

StoreDownPoint
repeat until a pixel value has been stored
    if the value of the current pixel is background then store the value down
    if the value of the current pixel is down then step to the next pixel on the right
    if the value of the current pixel is up
        then if the value of the next pixel on the left is not up, store the value background
        otherwise step to the next pixel on the left.
StoreUpPoint
repeat until a pixel value has been stored
    if the value of the current pixel is background, then store the value up
    if the value of the current pixel is up, then step to the next pixel on the left
    if the value of the current pixel is down
        then if the value of the next pixel on the right is not down then store the value background
        otherwise step to the next pixel on the right.

This is a new and simple method for rasterizing graphic images. It is capable of rasterizing any shape for which a positive winding number boundary can be drawn. One need not have analytic forms for the boundary, draw it in scan order, nor divide it at extreme points. The time dependency for rasterization is proportional to the perimeter of the objects drawn rather than their area. The method can be supported by hardware and can offer a significant advantage in high-speed image generation.

In accordance with the present invention, at the start of a page the frame-buffer is cleared so as to contain only background values. A polygon is entered into the frame buffer by changing the state of pixels along its left and right edges. Edges drawn downward are set to the down state, and those drawn upward are set to the up state. On imaging, the buffer is swept across a scan line at a time (left to right). At the start of each scan line the winding number is set to 0. If a down pixel is encountered the winding number is incremented; if an up pixel is encountered it is decremented. Pixels corresponding to a positive (or non-zero) winding number are shaded. The algorithm handles collisions where several edges intersect the same pixel. The scheme is to move spatially left or right to find a pixel where the change can be entered. A collision of an up state with a down state causes the two to cancel. A collision of down states causes a chain of down pixels propagating to the right, and a collision of up states caused propagation to the left. The problem with this scheme is that localized errors can arise from the ambiguity as to whether a pixel is set because a boundary edge passes through it or because several edges pass through a neighbor.

A solution to the above described dilemma requires additional pixel states and additional computation. However, it exactly represents the winding number changes at each pixel, so it is free of errors. In particular, in order to represent the winding number change exactly, two additional states are defined. The states will be labeled by the left and right parentheses "(", ")". Therefore, each pixel in the frame-buffer must be capable of taking on five states. These new states are used to delimit the winding number changes for pixels.

When a pixel is first found to lie on a boundary edge (for example, a downward edge), three pixels are changed in the frame-buffer. The pixel through which the edge passes will get a left parenthesis state "(". The next pixel on the right is marked with the down state "d", and the second pixel to the right gets the right parenthesis state ")" (see FIG. 12). If a second downward edge should pass through the pixel, a second down state is inserted between the parentheses. The right parenthesis shifts over one pixel to accommodate the additional state (see FIG. 13).

Figure 14:
Figure 15:
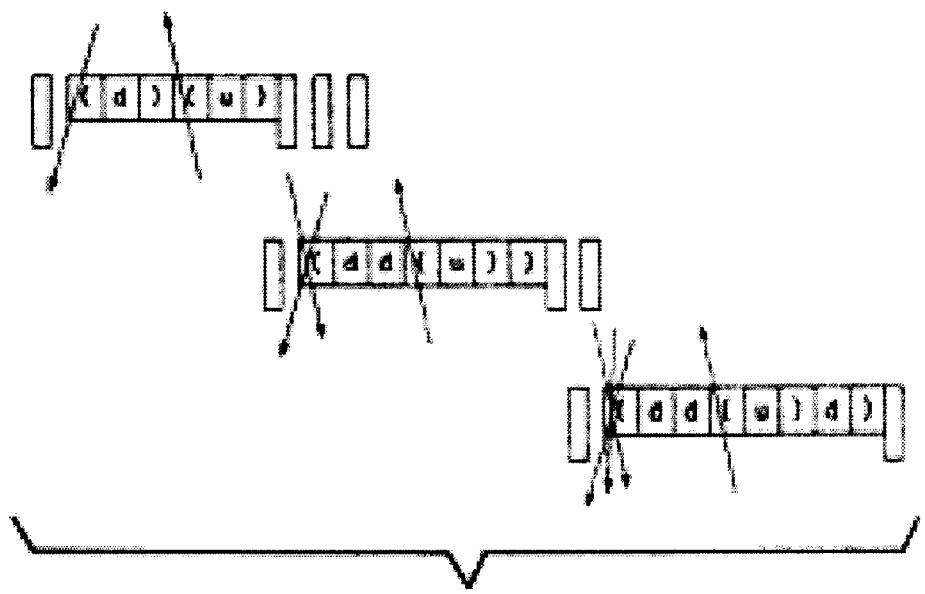

If an upward edge passes through the same pixel as a downward edge, one can either include both up and down states between parentheses, or one can cancel an up with a down state to reduce or eliminate the list (see FIG. 14). The up and down states affecting a pixel are enclosed in parentheses, with the left parenthesis indicating the boundary-edge pixel. As additional states are added, the list grows to the right. If it should encounter another list belonging to some pixel on its right, it skips past this second list and continues growing to its right (see FIG. 15).

Figure 16:
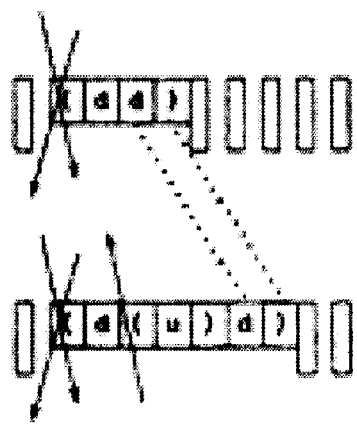
Figure 17:
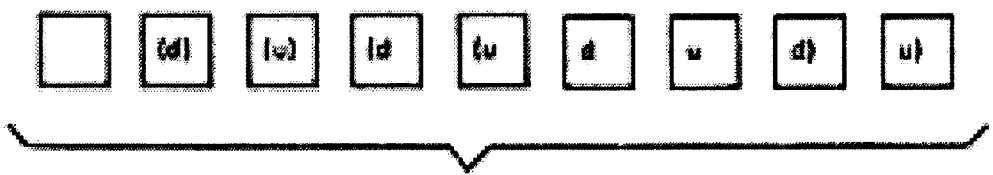
Figure 18:
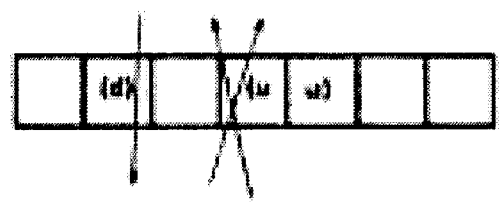

If an edge passes through a pixel for the first time, but that pixel already has a non-background value as part of the list for a pixel on its left, the values for this earlier list are shifted right three pixels to made room for the new list (see FIG. 16). As before, if a list is encountered to the right, it is skipped over and the displacement continues beyond it.

With this scheme, marking an edge can require changing up to three pixels from background to list structures, for each pixel through which the edge passes. Thus, very dense pictures can produce long lists, which always grow to the right. The problem of a list growing past the edge of the frame-buffer can be handled by just letting it wrap to the left side of the next scan line. This is often the way the frame-buffer memory is organized; no special handling is required at the edge of the frame-buffer. Note that when increasing the resolution of the imaging device the space available for this encoding increases as the square, while the number of edge pixels to be processed increases only linearly.

Figure 19:
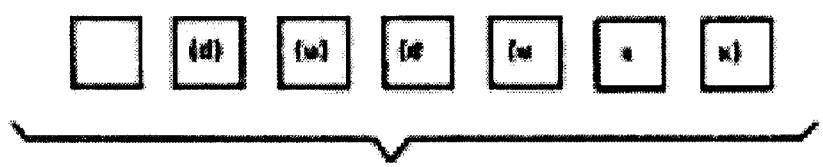

The length of the state lists can be reduced if each pixel is allowed additional states. With the 9 states shown in FIG. 17, lists can be built with only one pixel changed on a scan line for each edge passing through that scan line (see FIG. 18). If up and down states for a single pixel always cancel, a list will contain either all up states or all down states. Under this assumption, there are only 7 states required to represent lists with length proportional to the number of uncancelled boundary edges through a pixel as shown in FIG. 19.

Figure 20:
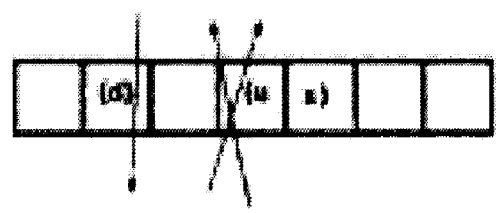

Here the first pixel in the list indicates whether it is a list of up or down edges, and for the remaining pixels in the list, "x" and "x)" count how many edges there are (see FIG. 20). In a binary computer system there is an advantage in requiring less than 8 states since that requires only three bits per pixel rather than four.

A further reduction in the length of the lists can be achieved by adding still more states. For example, one could add states which represent 2, 4 or 8 instances of the state in the list. However, a reduction can be achieved without new states by simply redefining the two states (up and down) to be 0 and 1 and then encoding the change in the winding number for the pixel as a binary number. For example, if five downward lines passed through a pixel, the change in the winding number would be +5. Instead of using the list (d d d d d), this could be represented by the list (0 1 0 1). The leading 0 establishes the sign of the number.

Usually, the boundaries of image components will be widely dispersed with little intersection or overlap. Thus it is expected that such encoding schemes will not be needed. The likelihood of overlap will lessen somewhat with increasing resolution since near edges which fall in the same pixel for low resolution can be mapped to separate pixels for high resolution. However for synthetic-graphic images, edges in pixels tend to be identical rather than just nearby, and in this case increasing resolution does not help. One operation which tends to create overlapping edges is clipping. If several objects overlap a clipping boundary, they will all be clipped to that boundary and have overlapping edges along the boundary. However, the degree of overlap of these edges is on the same order as degree of overlap of objects which is usually small.

The following is a sample implementation of the algorithms for managing the basic 5-state frame buffer encoding as described above. The procedures are coded in the C programming language.

It should be noted that an object entered into the extended frame buffer can later be removed or erased. Also, it should be noted that the scheme works for any boundary shape that can be sequentially generated, not just lines.

The first two routines deal with insertion of a value into a list for a given pixel. If a list does not already exist, one is created. The bulk of the work is done by the AddEntry procedure which inserts a single up, down, right parenthesis or left parenthesis value into the list for a pixel, shifting previous values to the right as needed. The EnterValue procedure uses AddEntry to create a list with the edge value (up or down) if one does not exist, or adds the value to an existing list. This sample implementation does not attempt to cancel up and down edges in a list.

```
AddEntry(x,y,value)
{parens=0;
putValue=value;
while ((oldValue=frame[x,y])!=BACKGROUND)
{if (oldValue==LEFTPARENTHESIS)
parens=parens+1;
else
if (parens==0)
{frame[x,y]=putValue;
putValue=oldValue;
}
else
if(oldValue==RIGHTPARENTHESIS)
parens=parens-1;
x=x+1;
}
frame[x,y]=putValue;
}
```

The purpose of the EnterValue procedure is to enter either three codes (a new list) or one code (a list extension) depending on whether or not a list exits for the pixel.

```
EnterValue(x,y, value)
{oldValue=frame[x,y];
if(old Value!=LEFTPARENTHESIS)
{AddEntry(x,y, RIGHTPARENTHESIS);
AddEntry(x,y, value);
AddEntry(x,y, LEFTPARENTHESIS);
}
else AddEntry(x+1,y, value);
}
```

The DisplayFrame procedure will construct the image from the extended frame buffer. The call to Shade represents the hardware action of shading a pixel.

```
DisplayFrame()
{for(y=0; y
{windingNumber=0;
for(x=0; x
{value=frame[x,y];
if(value==LEFTPARENTHESIS)
parens=1;
else parens=0;
z=x+1;
while (parens>0)
{value=frame[z,y];
if((parens==1)&&(value==DOWN))
windingNumber=windingNumber+1;
if((parens==1)&&(value==UP))
windingNumber=windingNumber-1;
if(value==LEFTPARENTHESIS)
parens=parens+1;
if(value==RIGHTPARENTHESIS)
parens=parens-1;
z=z+1;
}
if(windingNumber!=0)
Shade(x,y);
}
}
}
```

Note that with this scheme the order and position of the up and down states within the "frame-buffer" no longer correspond directly with the pixels being imaged. The states which indicate changes in a winding number (and thereby changes in shading) are displaced by parentheses and other lists. The DisplayFrame procedure scans through the list structure for each pixel to determine its net winding-number change. The repeated access of pixels during display can be avoided by using a variation on the sample algorithms. The idea is to grow the lists in the opposite direction from that used in the display scan. Then during the display scan one first encounters the end of the list, followed by all the list element, and finally the first of the list, which also marks the pixel to which the list belongs. With this approach, by the time a pixel is reached, the change in winding number for that pixel will be known. Because one may be in the middle of several lists at the same time, an auxiliary data structure such as a stack is needed by the DisplayFrame procedure to maintain the various list subtotals. The following is an example of a DisplayFrame procedure for this approach. It assumes that the lists do not wrap across scan lines.

```
DisplayFrame()
{for (y=0; y
{StackTop=0;
windingNumber=0;
for (x=MAXFRAMEX-1; x>=0; x--)
{value=frame[x,y];
if (value==RIGHTPARENTHESIS)
{StackTop=StackTop+1;
Stack[StackTop]=0;
}
if (value==UP)
Stack[StackTop]=Stack[StackTop]+1;
if (value==DOWN)
Stack[StackTop]=Stack[StackTop]-1;
if (value==LEFTPARENTHESIS)
{windingNumber=windingNumber+Stack[StackTop];
StackTop=StackTop-1;
}
if (windingNumber!=0)
Shade(x,y);
}
}
}
```

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for compression of characters, comprising:
   (a) selecting a mathematical representation for a plurality of characters based on a desired compression of the characters, wherein the mathematical representation is selected from a group including rational functions and polynomials;
   (b) representing the characters using the selected mathematical representation; and
   (c) compressing the mathematical representation of the characters.

2. The method as recited in claim 1, wherein the polynomials include exponents that are a power of two (2).

3. The method as recited in claim 1, wherein a width of a portion of the characters is represented by a mathematical representation including a curve and two functions which indicate distances perpendicular to the curve.

4. A method for compression of characters, comprising:
   (a) selecting a mathematical representation for a plurality of characters based on a desired compression of the characters, wherein the mathematical representation is selected from a group including parameterized curves and polynomials;
   (b) representing the characters using the selected mathematical representation; and
   (c) compressing the mathematical representation of the characters.

5. A method for compression of characters, comprising:
   (a) selecting a mathematical representation for a plurality of characters based on a desired compression of the characters, wherein the mathematical representation is selected from a group including parameterized curves and rational functions;
   (b) representing the characters using the selected mathematical representation; and
   (c) compressing the mathematical representation of the characters.

6. A method for compression of characters, comprising:
   (a) receiving a plurality of characters;
   (b) identifying a desired level of compression quality of the characters;
   (c) identifying a font associated with the characters;
   (d) selecting a mathematical representation for the characters based on the desired level of compression quality of the characters and the font associated with the characters;
   (e) representing the characters using the selected mathematical representation; and
   (f) compressing the mathematical representation of the characters.

7. A method for compression of characters, comprising:
   (a) selecting a mathematical representation for a plurality of characters based on a desired compression of the characters, wherein the mathematical representation is selected from a group including at least one of parameterized curves and rational functions;
   (b) representing the characters using the selected mathematical representation; and
   (c) compressing the mathematical representation of the characters.

* * * * *